US010413118B2

(12) United States Patent
Camden

(10) Patent No.: US 10,413,118 B2
(45) Date of Patent: Sep. 17, 2019

(54) LID HOLDING AND DRYING DEVICE

(71) Applicant: Mark T. Camden, Easton, PA (US)

(72) Inventor: Mark T. Camden, Easton, PA (US)

( * ) Notice: Subject to any disclaimer, the term of this patent is extended or adjusted under 35 U.S.C. 154(b) by 0 days.

(21) Appl. No.: 16/032,336

(22) Filed: Jul. 11, 2018

(65) Prior Publication Data

US 2019/0029465 A1   Jan. 31, 2019

Related U.S. Application Data

(60) Provisional application No. 62/532,251, filed on Jul. 13, 2017.

(51) Int. Cl.
*A47J 36/12*   (2006.01)

(52) U.S. Cl.
CPC ..................... *A47J 36/12* (2013.01)

(58) Field of Classification Search
USPC ....................................................... 248/176.2
See application file for complete search history.

(56) References Cited

U.S. PATENT DOCUMENTS

| 807,840 | A | * | 12/1905 | Martin | A47G 21/14 |
| | | | | | 248/229.16 |
| 2,705,657 | A | * | 4/1955 | Di Giorgio | A47J 45/10 |
| | | | | | 220/744 |
| 3,305,100 | A | * | 2/1967 | Barbee | A47L 13/512 |
| | | | | | 211/120 |
| 4,850,556 | A | * | 7/1989 | Otani | A47J 47/16 |
| | | | | | 248/206.2 |
| 4,915,433 | A | * | 4/1990 | Schafer | A47J 36/12 |
| | | | | | 294/12 |
| 5,127,616 | A | | 7/1992 | Carney | |
| 5,246,195 | A | * | 9/1993 | Huff | A47J 47/16 |
| | | | | | 248/309.1 |
| 6,012,593 | A | * | 1/2000 | Knittel | A47J 47/16 |
| | | | | | 211/181.1 |
| 6,361,004 | B1 | * | 3/2002 | Witherspoon | A47J 36/12 |
| | | | | | 248/213.2 |
| 7,284,733 | B2 | * | 10/2007 | Parenteau | A47J 45/10 |
| | | | | | 220/263 |
| 8,727,139 | B1 | * | 5/2014 | Sventek | A47J 36/12 |
| | | | | | 211/41.11 |
| 8,833,569 | B2 | | 9/2014 | Clarkson | |
| D749,896 | S | | 2/2016 | Pallotto et al. | |

(Continued)

*Primary Examiner* — Monica E Millner
(74) *Attorney, Agent, or Firm* — Kattina V. Barsik, Esq.

(57) ABSTRACT

A lid holding device of the present invention provides distinct benefits over conventional problems to solve the issue of stationing the covers of cooking containers, including one-hand operation, universal fit with pots and pans, ideal drainage of condensation and increased cleanliness by virtue of a vertical resting position, enhanced safety around high-temperature stoves, pots, racks and lids, optimal space utilization, removal of the need for hot plates and pads and trivets, and comfortable and ergonomic ease of use. The device may include various portions in the form of an attaching member, a protruding member, a hook member and a handle member in coupled configuration to each other to solve such conventional problems. The device may be a unitary or multi-part and can withstand high temperature in and around the kitchens. The device is sturdy and includes compact design, allowing convenient storage in typical drawers, utensil holders or hooks.

15 Claims, 7 Drawing Sheets

(56) References Cited

U.S. PATENT DOCUMENTS

| | | | |
|---|---|---|---|
| 10,188,240 B2* | 1/2019 | Clarke | A47B 55/02 |
| 2006/0186124 A1* | 8/2006 | Sergianni | A47J 47/16 |
| | | | 220/572 |
| 2006/0237468 A1* | 10/2006 | Dukes | A47L 13/512 |
| | | | 220/735 |
| 2008/0251472 A1* | 10/2008 | Kasden | A47J 36/06 |
| | | | 211/41.2 |
| 2009/0230134 A1 | 9/2009 | Romandy | |
| 2011/0260023 A1 | 10/2011 | Braun | |
| 2012/0235003 A1 | 9/2012 | Turbes | |
| 2015/0164268 A1* | 6/2015 | Hurley | A47J 36/12 |
| | | | 220/573.1 |
| 2016/0374506 A1* | 12/2016 | Bui | A47J 36/12 |
| | | | 220/744 |

* cited by examiner

LID HOLDING AND DRYING DEVICE

BACKGROUND

Field of Endeavor

The present disclosure pertains to a tool for use in the kitchen, and, more specifically, to a device for being used in conjunction with a lid and pot in the kitchen.

Brief Description of the Related Art

Personal, residential and industrial cooking and kitchens have various uses in the industries of kitchen products and cookware, cabinetry and kitchen storage, and camping and other outdoor uses.

Lids and other coverings for pots, pans, and other cooking vessels and containers often create a mess and pose a safety concern while cooking, frequently being hot to the touch and dripping with heated and/or sticky liquids from within the container and condensation.

While attempts have been made to address the foregoing issue, both in novel product and processes, none may have adequately addressed the need as desired. Clips have been devised to hold the container lid (and/or utensils and other accessories) on the outer edge or side of the container. These are not ideal as they require two hands to apply, remove, and otherwise utilize. Similarly, multi-piece or multi-element tools fall short of the goal of having an easy-to-use and maneuver device, without assembly or the risk of breaking or malfunction.

Generally, many of the proposed solutions above, including clips, hooks, and separate holders or other receptacles, may have failed to meet the current commercial and practical needs for a variety of reasons. None have been fully able to adapt to the wide variety of products most commonly utilized and may not be operational with or appropriately sized to fit the lids or covers of all pots and pans. In addition to a universally sized solution, consumers require a solution which can accommodate coverings having varying degrees of concavity and knobs and handles of varying forms and sizes. While many standing or leaning structures exist, designed for stovetop, tabletop and countertop use, these overlook the necessity of free space in these contexts, a requirement for many consumers and a desire of almost all of them. Conventionally available products and commercially available products may not provide practical and efficient solutions for the un-met need of coverings for pots and pans.

In view of the above, a need exists for a novel lid holder having better overall performance.

SUMMARY

The present invention discloses a lid holding device that will be presented in the following simplified summary to provide a basic understanding of one or more aspects of the invention that are intended to overcome the discussed drawbacks, but to include all advantages thereof along with providing some additional advantages. This summary is not an extensive overview tithe invention. It is intended to neither identify key or critical elements of the invention, nor to delineate the scope of the present disclosure. Rather, the sole purpose of this summary is to present some concepts of the disclosure, its aspects and advantages in a simplified form as a prelude to the more detailed description that is presented hereinafter.

In accordance with the above, it is a general object of the present invention to provide a device and method of securing the coverings of cooking vessels and containers and offers several products and accessories relating to cooking and kitchen products and accessories for pots and pans and cooking utensils that have a better overall performance.

In accordance with the above, it is a further object of the present invention to provide a device and method to prevent the surrounding from the drips leaking out from the lid while cooking and condensation around when the lid is placed on the countertop of the kitchen.

In accordance with the above, it is a further object of the present invention to provide a device and method to facilitate ventilation of vapors from the pot while cooking, without the requirement of the lid to be placed away from the top over the countertop of the kitchen.

In one aspect of the present invention, a lid holding device for supporting a lid above a pot is disclosed. The lid holding device may include an attaching member, a protruding member, a hook member and a handle member in a coupled configuration to each other. The attaching member may be capable of being engaged to the pot. The attaching member may include a complementary engaging structure to that of the pot to be capable of being engaged with the top of the pot. The attaching member may be a bottom body portion of the lid holding device. The protruding member may extend from the attaching member. The protruding member may include a top portion and a bottom portion. The bottom portion of the protruding member may engage with the attaching member and extends therefrom. The protruding member may include a central body portion of the lid holding device extending up to the top and bottom portions thereof. Further, the hook member may extend from the top portion of the protruding member. The hook member may be capable of being engaged with the lid. The hook member may include a curvature leading away from the lid and capable of being engaged to the hook member. The hook member may be a top body portion of the lid holding device. Furthermore, the handle member may be coupled to the protruding member and may extend linearly in a spaced manner from the protruding member. The handle member from the top portion of the protruding member may extend up the entire length of the protruding member and above the bottom portion of the protruding member.

In one embodiment, the complementary engaging structure of the attaching member may include a c-shaped clip profile comprising c-shaped flanges and a longitudinal flange extending in a spaced manner downwardly from the attaching member to form a recess therebetween to engage with the top of the lid to firmly grip the c-shaped clip profile with the top of the lid. In other embodiments, the complementary engaging structure of the attaching member may include at least one press and lock arrangement, snap and lock arrangement, and male-female interlocking structure including, but not limited to, keyway, pin and socket, and dovetail.

In one embodiment, the bottom portion of the protruding member includes a substantially conically extending structure from the attaching member. The conical structure may be capable of being partially extended within the pot when the lid holding device is engaged with the pot. The conically extending structure may bend at the top to form a seat for the lid to be angularly aligned on the pot.

In one embodiment, the top portion of the protruding member may include a substantially curved profile to be in sync with the curvature of the hook member.

In one embodiment, the protruding member may extend taperedly between the top and bottom portions thereof.

In one embodiment, the hook member may include a fork-like profile with one or more prongs.

In one embodiment, the lid holding device may include a base support member to hold the lid holding device. The base support member may include a drip catch profile to catch liquids dripping out of the lid. Further, the base support member may include a holding profile to hold the lid holding device in a position over the bast support member. Furthermore, the base support member may also include a holding profile complementary to a profile of the attaching member to hold the lid holding device in a position over the base support member.

In another embodiment, the lid holding device may also include a wall clip mountable to a wall to hold the lid holding device on to the wall.

In a further aspect of the present disclosure, a lid holding device for supporting a lid above a pot for ventilation of vapors from the pot while cooking is disclosed. The lid holding device of this aspect may include an attaching member, a hook member, a protruding member and a handle. The attaching member may be capable of being engaged to the pot. The hook member may be capable of being engaged to the lid. Further, the protruding member may extend between the attaching member and the hook member. The protruding member may include a top portion closer to the hook member and a bottom portion closer to the attaching member. The protruding member may include a central body portion extending up to the top and bottom portions thereof. The bottom portion of the protruding member may include a substantially conically extending structure from the attaching member. The conical structure may be capable of being partially extended within the pot when the lid holding device engages with the pot. The conically extending structure may bend at the top to form a seat for the lid to be angularly aligned on the pot. Furthermore, the handle member may be coupled to the protruding member and extends linearly in a spaced manner from the protruding member. The handle from the top portion of the protruding member extends up to the entire length of the protruding member and above the bottom portion of the protruding member.

In one another aspect of the present disclosure, a lid holding device for supporting a lid above a pot for preventing liquid from dripping out of the lid is disclosed. The lid holding device may include an attaching member, a hook member, a protruding member and a handle. The attaching member may be capable of being engaged to a pot. The hook member may be capable of being engaged to the lid. The protruding member may extend between the attaching member and the hook members. Further, the handle member may be coupled to the protruding member and extends linearly in a spaced manner from the protruding member. Furthermore, the base support member may be capable of holding the lid holding device. The base support member may include a drip catch profile to catch liquids dripping out of the lid. The base support member may include a holding profile to hold the lid holding device in a position over the base support member.

In one further aspect of the present disclosure, a method for supporting a lid above a pot using a lid holding device having an attaching member, a protruding member, a hook member and a handle member in coupled configuration to each other is disclosed. The method may include: gripping the handle to hold the lid holding device; engaging the hook member with a knob of the lid to firmly secure the knob with the hook member; lifting the lid from the pot with the handle such that the lid holding device is vertically aligned to the pot; and engaging the attaching member with the top of the pot to hangingly align the lid vertically with respect to the pot.

In one further aspect of the present disclosure, a method for supporting a lid above a pot for ventilation of vapors from the pot while cooking using a lid holding device comprising an attaching member, a protruding member, a hook member and a handle member in coupled configuration to each other is disclosed. According to this aspect, the method may include: gripping the handle member coupled to the protruding member to hold the lid holding device. The protruding member may extend between the attaching member and the hook member. The protruding member may include a top portion closer to the hook member and a bottom portion closer to the attaching member. The protruding member may include a central body portion extending up to the top and bottom portions thereof. The bottom portion of the protruding member may include: a substantially conically extending structure from the attaching member. The conical structure may be capable of being partially extended within the pot when the lid holding device is engaged with the pot. The conically extending structure may bend at the top to form a seat for the lid to be angularly aligned on the pot. The method may further include engaging the attaching member with the top of the pot; and placing the lid over the pot such that a portion of the lid is accommodated over the seat to align the lid taperedly with respect to the pot forming a tapered space between the lid and the pot for ventilation of vapors from the pot while cooking.

In one yet further aspect of the present disclosure, a method for supporting a lid above a pot for preventing liquids from dripping out of the lid using a lid holding device comprising an attaching member, a protruding member, a hook member and a handle member in coupled configuration to each other; and a base support member to hold the lid holding device, is disclosed. The method according to this aspect may include gripping the handle to hold the lid holding device; engaging the hook member with a knob of the lid to firmly secure the knob with the hook member; lifting the lid from the pot with the handle such that the lid holding device is vertically aligned to the pot; and engaging the attaching member to a holding profile of the base support member to hold the lid holding device to hangingly align the lid vertically with respect to the base support member, wherein the base support member comprises a drip catch profile to catch liquids dripping out of the lid.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

Reference will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Unless otherwise stated, all dimensions are in inches and drawings are not to scale. Several schematic drawings are provided and images of exemplary prototypes.

Like reference numerals refer to like parts throughout the description of several views of the drawings.

DETAILED DESCRIPTION OF THE DRAWINGS

Figure 1A:
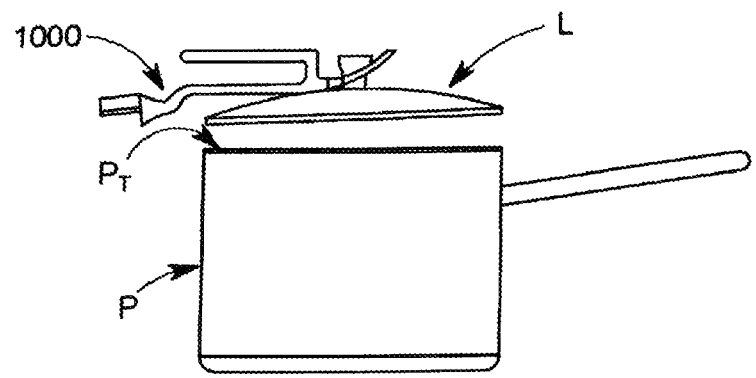
FIGS. 1A and 1B illustrate a lid holding device in utilization environment in conjunction with a lid and a pot, in accordance with an exemplary embodiment of the present disclosure.

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all, referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifies for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second" and the like, herein do not denote any order, elevation or importance, but rather are used to distinguish one element from another. Further, the terms "a," "an," and "plurality" herein do not denote a limitation of quantity, but rather denote the presence of at least one of the referenced item.

The present invention provides an apparatus in the form of the lid holding device 1000 that is sorely missing in residential and commercial kitchens and provides distinct benefits over previous failed attempts to solve the issue of stationing the covers of cooking containers, including one-hand operation, universal fit with pots and pans, ideal drainage of condensation and increased cleanliness by virtue of a vertical resting position, enhanced safety around high-temperature stoves, pots, racks and lids, optimal space utilization, removal of the need for hot plates and pads and trivets, and comfortable and ergonomic ease of use.

The lid holding device of the present invention may be a multipurpose and universal device for being used in the kitchen, including, stovetop and countertop, in a variety of applications, including, but not limited to, holding, gripping, and maneuvering of various kitchen utensils to conveniently lift and neatly secure lids of various pots, pans and other cooking vessels and containers. The lid holding device of the present invention may be conveniently used with various types of kitchen utensils, while and after cooking. The lid holding device of the present invention contains essential features, including, but not limited to, a sturdy but compact design, allowing for convenient storage in a typical drawer or utensil holder or hook, insulated and durable material composition, and ergonomic and functional configuration.

The lid holding device 1000 may be made from a variety of materials, including, but not limited to, durable plastics, non-conductive metals and/or wood, as per the requirement of the user. However, without departing from the scope of the present disclosure, the lid holding device 1000 may be made of any other material having characteristics to withstand the heat and temperature of the fire or pot and lid on the countertop or stovetop, as normally found in and around the kitchen.

Several of the embodiments of the lid holding device 1000 that will be described herein are designed to be used with handles and knobs of different sizes and types, and adapt to and hold lids of various size and heights at an angled or vertical position allowing drippings of liquid from the lid to fall into the pot, and at the same time, not substantially block the pot opening thereby facilitating the user to stir or watch the cooking food in the pot. This also allows users to easily serve themselves without the lid interfering with them. It is stabilized by the substantial weight of the pot and its contents resting on the base and results in a stable, adjustable design.

Figure 1B:
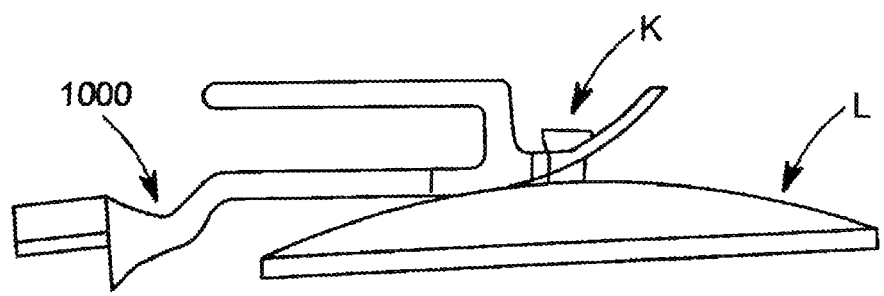

Referring now to FIGS. 1A and 1B, the lid holding device 1000 (herein after may also be referred to as 'device 1000') in its utilization environment in conjunction with a lid "L"

with a knob "K", and a pot "P", in accordance with an exemplary embodiment of the present disclosure. The lid holding device 1000 as depicted in FIGS. 1A and 1B in conjunction with the lid "L" and the pot "P" is only for the purpose of better understanding of the disclosure and may not be considered to be limiting in any manner to such lid and pot as depicted. The device 1000, without departing from the scope of the present disclosure, may be used in the kitchen, including on the stovetop and countertop, to conveniently lift and neatly secure any lid and cover like utensils such as pots and pans, and other cooking vessels and containers, while and after cooking.

Figure 2A:
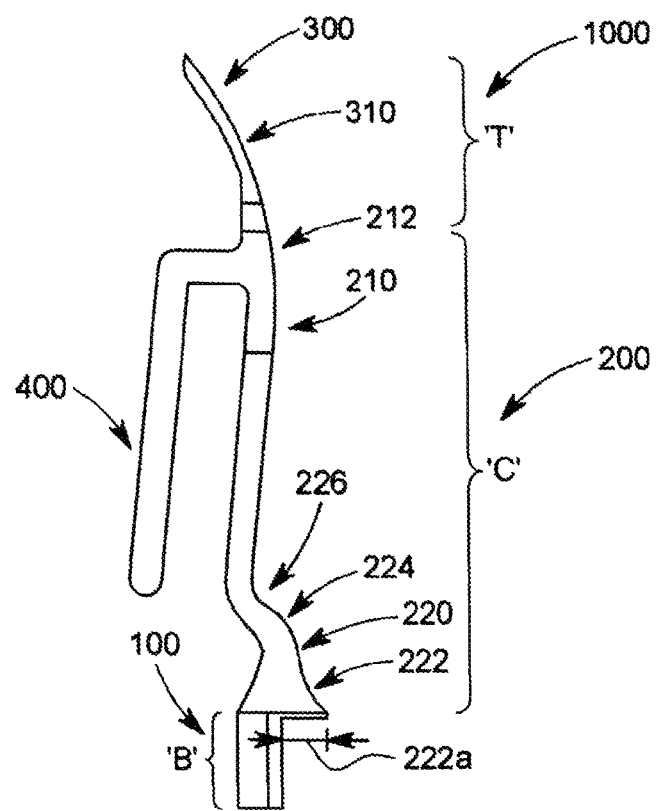
FIG. 2A illustrates a side view of a lid holding device, in accordance with an exemplary embodiment of the present disclosure.
Figure 2B:
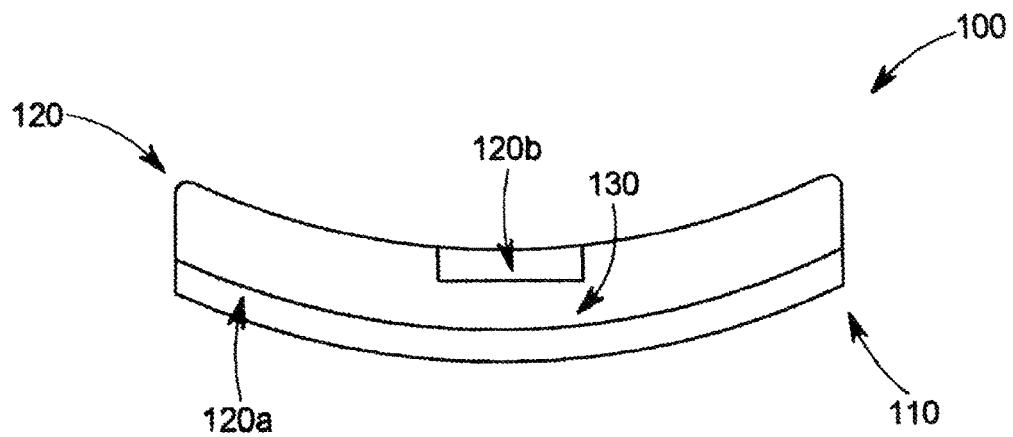
FIG. 2B illustrates a bottom view of a lid, holding device, in accordance with an exemplary embodiment of the present disclosure.
Figure 2C:
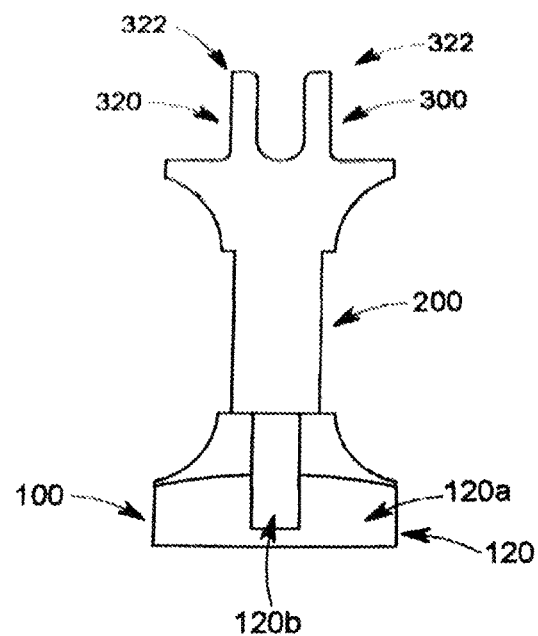
FIG. 2C illustrates a back view of a lid holding device, in accordance with an exemplary embodiment of the present disclosure.
Figure 2D:
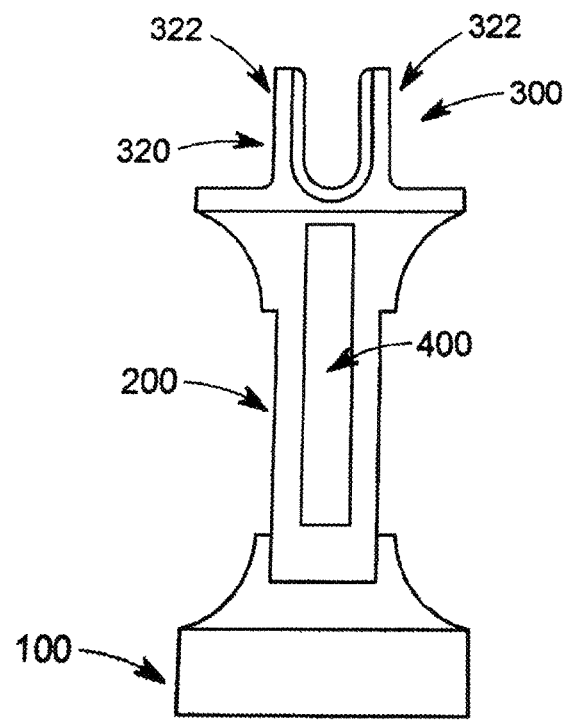
FIG. 2D illustrates a front view of a lid holding device, in accordance with an exemplary embodiment of the present disclosure.

Referring now to FIGS. 2A to 2D, and to FIGS. 1A and 1B, to describe various embodiments of the device 1000 for being utilized in conduction with the lid "L" the pot "P". FIGS. 2A to 2D illustrate various views of the device 1000. Specifically, FIG. 2A illustrates a side view of the device 1000, FIG. 2B illustrates a bottom view of the device 1000, FIG. 2C illustrates a back view of the device 1000, and FIG. 2D illustrates a front view of the device 1000, in accordance with an exemplary embodiment of the present disclosure. The device 1000 as illustrated in FIGS. 2A to 2D may include various modifications and alterations, dimensionally and structurally, and may not be considered limiting to only such devices as depicted in FIGS. 2A to 2D.

As shown in FIGS. 1A to 1D, the device 1000 may include an attaching member 100, a protruding member 200, a hook member 300 ands handle member 400 in a coupled configuration with each other. The attaching member 100 may be capable of being engaged to the pot "P". The attaching member 100, as shown in FIG. 2B, may include a complementary engaging structure 110 to that of the pot "P" to be capable of being engaged with the top "$P_T$" of the pot "P". In an aligned configuration of the device 1000 for being used, the attaching member 100 may be a bottom body portion "B" of the device 1000, as shown in FIG. 2A.

In one embodiment, as shown in FIG. 2B, the complementary engaging structure 110 of the attaching member 100 may include a c-shaped clip profile 120. The c-shaped clip profile 120 may include c-shaped flanges 120a and a longitudinal flange 120b, also seen in FIG. 2C, extending in a spaced manner downwardly from the attaching member 110 to form a recess 130 therebetween. Such c-shaped clip profile 120 including the c-shaped flanges 120a and a longitudinal flange 120b and forming the recess 130 therebetween engages with the top "$P_T$" of the pot "P" through the recess 130 to firmly grip the c-shaped clip profile 120 with the top "$P_T$" of the pot "P".

In another embodiment of the present disclosure, the complementary engaging structure 120 may include, without departing from the scope of the present disclosure, at least one press and lock arrangement, snap and lock arrangement, male-female interlocking structures including, but not limited to, keyway, pin and socket, dovetail, and the like.

Further, without departing from the scope of the present disclosure, attaching member 100 or the complementary engaging structure 120 may include any other structural configuration, other than as shown or described herein, such as, structures corresponding to any other pot design to be engaged therewith. The attaching member 100 as depicted or described herein or in FIG. 2C, are only for the purpose of better understanding of an embodiment of the present disclosure, and this should not in any manner considered to be limiting to only as shown or described herein. The attaching member 100, which is free of radial dimensions and simply includes a complementary engaging structure to that of the lid in the form of a press-lock, snap-lock or male-female interlocking structure including, but not limited to, keyway, pin and socket, or dovetail that fits on the radius or edge of most pots and pans of any size, height or diameter thereof.

Further, as shown in FIGS. 2A and 2C-2D, the protruding member 200 may extend from the attaching member 100. Specifically, the protruding member 200 may be aligned and extended between the attaching member 100 and the hook member 300. The protruding member 200 may include a top portion 210 and a bottom portion 220. The bottom portion 220 of the protruding member 200 may engage with the attaching member 100 and extend therefrom.

In one embodiment, the bottom portion 220 of the protruding member 200 may include a substantially conically extending structure 222 extending from the attaching member 200. The conical stricture 222 may be capable of being partially extended within the pot, such as a portion 222a of the conical structure 222, when the device 1000 is engaged with the pot "P". Further, the conically extending structure 222 may bend at a top 224 thereof to form a seat 226 for the lid "L" to be angularly placed on the pot "P", when the device 1000 is used with the lid "L" and the pot "P", and will be described herein below.

Further, in one embodiment, as seen in FIG. 1A, the top portion 210 of the protruding member 200 may include a substantially curve-shaped profile 212.

Furthermore, the protruding member 200 may extend taperedly up to the top 210 and bottom 220 portions thereof. However, without departing from the scope of the present disclosure, the protruding member 200 may extend straightly between the top 210 and bottom 220 portions thereof. In an aligned configuration of the device 1000 for being used, the protruding member 200 of the device 1000 forms a central body portion "C" of the device 1000, extending up to the top and bottom portions 210, 220 thereof.

The protruding member 200 as depicted or described herein or in FIGS. 2A and 2C-2D, are only for the purpose of better understanding of an embodiment of the present disclosure, and this should not in any manner be considered to be limiting to only as shown or described herein.

Again, as shown in FIGS. 2a and 2C-2D, the hook member 300 of the device 1000 will be described. The hook member 300 may extend from the top portion 210 of the protruding member 200. The hook member 300 may include a curvature 310, such that when the device 1000 is utilized with the lid "L", the curvature 310 may lead away from the lid "L". The curvature 310 of the hook member 300 may sync with the substantially curve-shaped profile 212 of the trip portion 210 of the protruding member 200 to form an overall curved profile such that when the device 1000 is utilized with the lid "L", such curved profile formed by the curvature 310 of the book member 300 and curve-shaped profile 212 of the top portion 210 of the protruding member 200 leads away from the lid "L".

In an aligned configuration of the device 1000 for being used, the hook member 300 of the device 1000 forms a top body portion "T" of the device 1000.

In one embodiment, as shown in FIGS. 2C and 2D, the hook member 300 may include a fork-like profile 320 with one or more prongs 322. The hook member 300 may be capable of being engaged to the knob "K" of the lid "L" using prongs 322 of the hook member 300. However, without departing from the scope of the present disclosure, the hook member 300 may include any other structural configuration, other than prongs, such as, a structure corresponding to any other lid or knob design structure to be engaged therewith. The hook member 300 as depicted or described herein or in FIGS. 2A-2D, are for better understanding of an embodiment of the present disclosure, and this should not in any manner be considered to be limiting to only as shown or described herein. The prongs or forks, as shown herein, designed to interact with the knob of the lid or cover are contemplated to be varying in length, width, number, and spacing or configuration, such that, the device 1000 supports, in a stable fashion, the diverse sizes and weight of the lids and covers commonly used by most consumers.

Referring again to FIGS. 2A and 2D, a handle member 400 of the device 1000 is shown and described herein, in accordance with an embodiment of the present disclosure. The handle member 400 may be coupled to the protruding member 300 and extends linearly in a spaced manner from the protruding member 300 towards the attaching member 100. The handle member 400 from the top portion 210 of the protruding member 200 may extend linearly in a spaced manner from the protruding member 300 and bend after a certain height to extend up to the entire length of the protruding member 200 and above the bottom portion 220 of the protruding member 200. The handle 400, as shown in an embodiment here, may be of a unitary design, adding to the stability and durability of the finished device 1000. The handle 400 may include a sturdy but compact design, allowing for convenient utilization for holding or lifting the device 1000 while using the device 1000 or while manually cleaning the device 1000.

However, without departing from the scope of the present disclosure, the handle member 400 may include any other structural configuration, other than as depicted or described herein or in FIGS. 2A and 2D. The handle member 400 as depicted and described herein are only for the purpose of better understanding of an embodiment of the present disclosure, and this should not in any manner be considered to be limiting to only as shown or described herein.

Figure 3A:
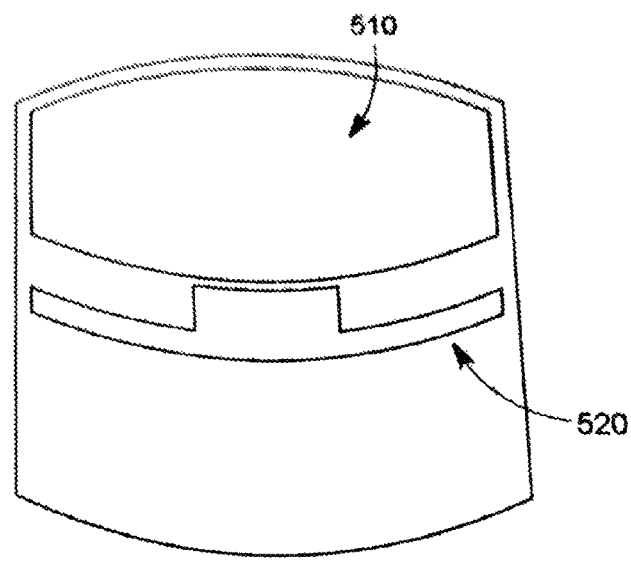
FIGS. 3A-3D illustrate various views of a base support member wherein a lid holding device may be place, in accordance with an exemplary embodiment of the present disclosure.
Figure 3B:
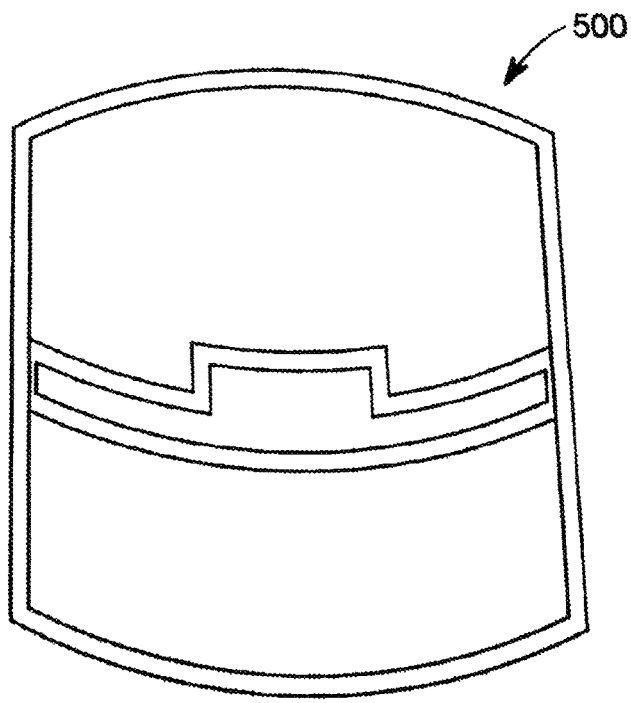

Referring now to FIGS. 3A-3D, depicting various views of a base support member 500. The base support member 500 is where the device 1000 may be placed while the device 1000 is in use or not in use, in accordance with an exemplary embodiment of the present disclosure. Specifically, FIG. 3A illustrates a top view of the base support member 500, FIG. 3B illustrates a bottom view of the base support member 500, FIG. 2C illustrates a front view of the base support member 500, and FIG. 2D illustrates a side view of the base support member 500, in accordance with an exemplary embodiment of the present disclosure.

Figure 3C:
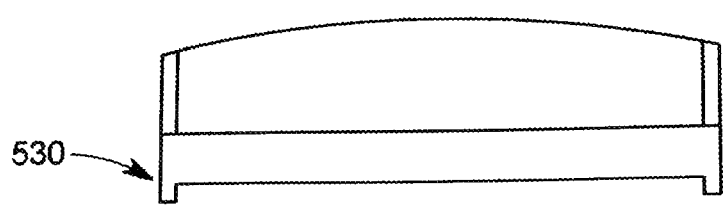
Figure 3D:
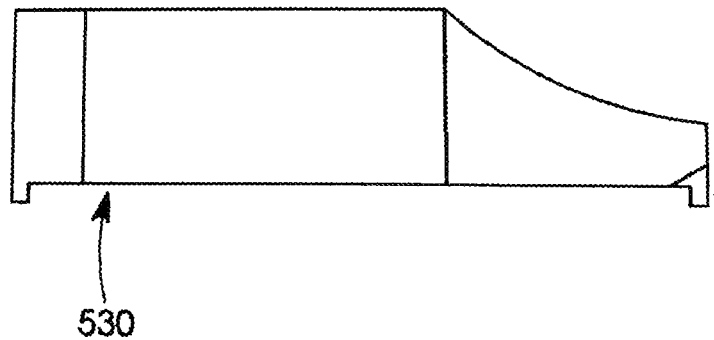

As shown in FIG. 3A, the base support member 500 may include a drip catch profile 510 and a holding profile 520 configured on a base surface 530, as seen in FIG. 3C. The holding profile 520 may be configured to hold the device 1000 in a position over the base support member 500. In one embodiment, the holding profile 520 may be complementary to a profile of the attaching member 100 to hold the device 1000 in a position over the base support member 500, while the device 1000 is in use or not in use. Further, when the lid "L" is removed from the pot "P", when certain foods are being cooked in the pot "P", the lid may release liquids, such as vapor drops, dripping out of the lid "L" that may be accommodated in the drip catch profile 510, while the device 1000 is placed in the holding profile 510 via the attaching member 100.

Further, without departing from the scope of the present disclosure, base support member 500 may include any other structural configuration, other than as shown or described herein, such as, structures corresponding to any other design or the device 1000 to be engaged therewith. The base support member 500 as depicted or described herein or in FIGS. 3A-3C, are only for better understanding of an embodiment of the present disclosure, and this should not in any manner be limiting to only as shown or described herein.

Figure 4:
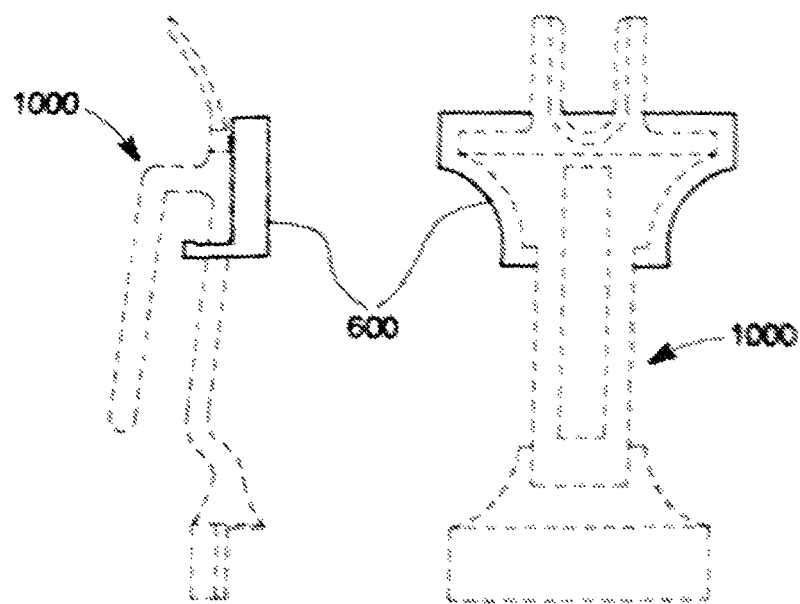
FIG. 4 illustrates a wall clip mountable to a wall to hold the lid holding device on to the wall, in accordance with an exemplary embodiment of the present disclosure.

Referring now to FIG. 4, the device 1000 may include a wall clip 600. The wall clip 600 may be mountable to a wall to hold the device 1000 on to a wall, when the device is not in use. Such wall clip 600 frees up the space over the counter in a kitchen and ensures the device 1000 to be placed in a secure and safe manner, without the chances of such device 1000 to be misplaced when not in use.

Figure 5:
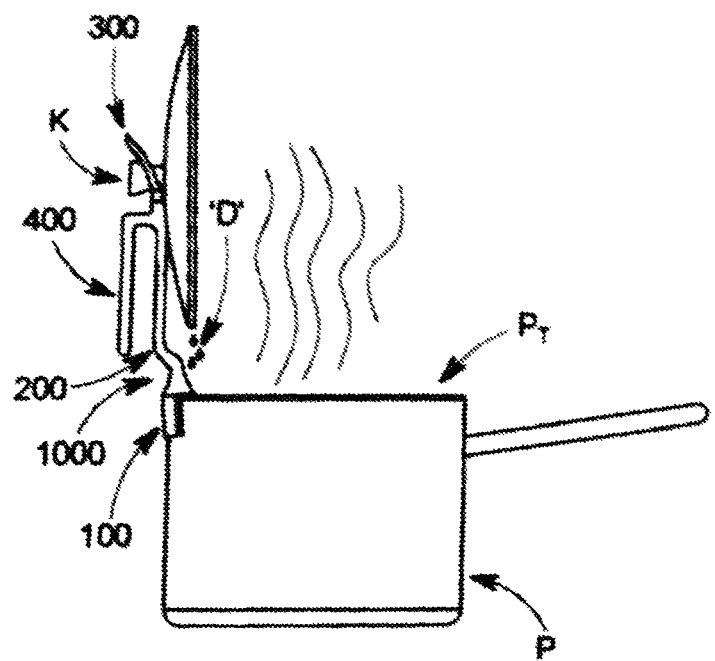
FIG. 5 illustrates usages of a lid holding device in utilization environment in conjunction with a lid and a pot, in accordance with an exemplary embodiment of the present disclosure.

Referring now to FIG. 5, which illustrates usages of a lid holding device, such as the device 1000, in its utilization environment in conjunction with a lid, such as the lid "L", and a pot, such as the pot "P", in accordance with an exemplary embodiment of the present disclosure.

As per usages of the device 1000 according to this embodiment, as depicted in FIG. 5, the device 1000 is utilized for supporting the lid "L" in conjunction with the pot "P". The device 1000 may be gripped via the handle 400 by a user. The user may engage the device 1000 with the knob "K" of the lid "L" via the hook member 300 to firmly secure the knob "K" with the hook member "300". Further, the lid "L" is raised up from the pot "P" with the handle 400 such that the device 1000 may be vertically aligned with respect to the pot "P" to engage the attaching member 100 with the top "$P_T$" of the pot "P" to hangingly align the lid vertically with respect to the pot "P".

As per the usages of the device 1000 according to this embodiment, the lid "L" may be secured to the pot "P" via the device 1000. In this embodiment, the vapor drips, as indicated by reference "D" intend to fall within the pot "P" and not in the surroundings of a countertop of a kitchen. The purpose of the usages of the device 1000 according to this embodiment, are to prevent the condensation from the vapor drips and liquids from leaking out while cooking when the lid "L" is placed on the countertop of the kitchen. As per the usages of the device 1000 according to this embodiment, the vapor drips "D" which arise during the cooking and stick to the lid "L" are securely dripped back into the pot "P".

Figure 6:
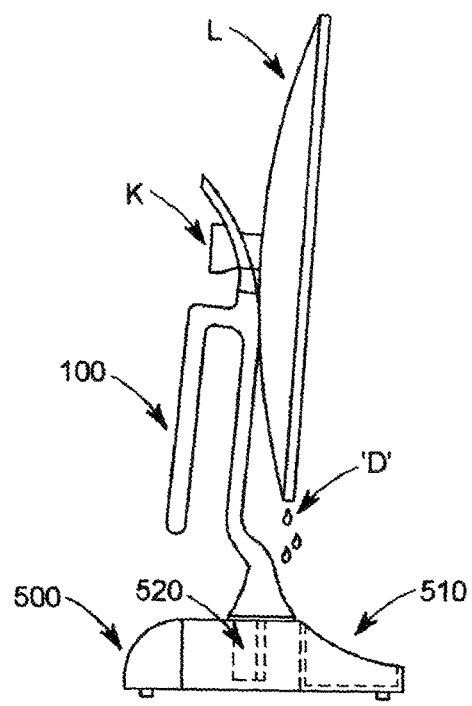
FIG. 6 illustrates usages of a lid holding device in utilization environment in conjunction with a lid and a pot and base support member, in accordance with another exemplary embodiment of the present disclosure.

FIG. 6 illustrates usages of the device 1000 in its utilization environment in conjunction with the lid "L" and the pot "P" and the base support member 500, in accordance with another exemplary embodiment of the present disclosure.

As per usages of the device 1000 according to this embodiment as depicted in FIG. 6, the device 1000 is utilized for supporting the lid "L" in conjunction with the pot "P" and the base support member 500. The device 1000 may be gripped via the handle 400 by a user. The user may engage the device 1000 with the knob "K" of the lid "L" via the hook member 300 to firmly secure the knob "K" with the hook member "300", Further, the lid "L" is raised upward from the pot "P" with the handle 400 such that the device 1000 may be vertically aligned with respect to the pot "P". Further, the device 1000 in vertically aligned position via the attaching member 100 may be engaged to the base support member 500. Specifically, the device 1000 via the attaching member 100 may be engaged to the holding profile 520 of the base support member 500 to hold the device 1000 to hangingly align the lid "L" vertically with respect to the base support member 500.

As per the usages of the device 1000 according to this embodiment, the lid "L" may be secured to the base support member 500 via the device 1000. In this embodiment, the vapor drips, as indicated by reference "D" fall within the drip catch profile 510 of the base support member 500 and not in the pot "P" or in the surroundings of a countertop of a kitchen. The purpose of the usages of the device 1000 according to this embodiment, is to prevent the surrounding from the vapor drips or liquids leaking out while cooking when the lid "L" is placed on the countertop of the kitchen. As per the usages of the device 1000 according to this embodiment, the vapor drips "D" which arise during the cooking and stick to the lid "L" are securely dripped into the drip catch profile 510 of the base support member 500.

Figure 7:
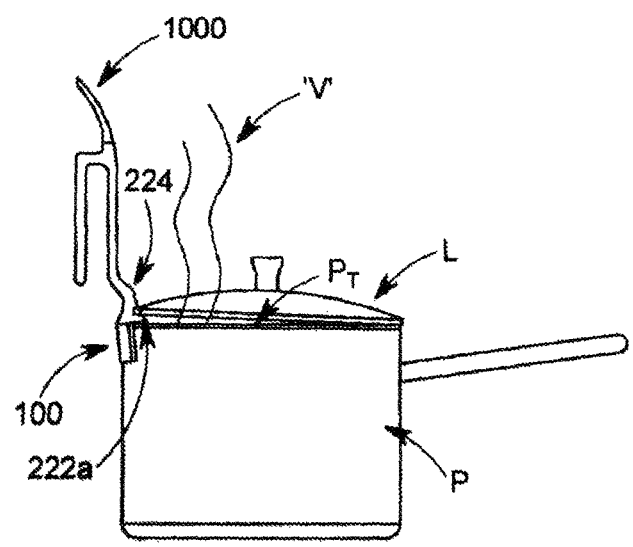
FIG. 7 illustrates usages of a lid bolding device in utilization environment in conjunction with a lid and a pot, in accordance with yet another exemplary embodiment of the present disclosure.

Referring now to FIG. 7 that depicts yet further usages of the device 1000 in its utilization environment in conjunction with a lid and a pot, in accordance with another exemplary embodiment of the present disclosure.

As per the usages of this embodiment, the device 1000 may be utilized for supporting the lid "L" above the pot "P" for ventilation of vapors from the pot "P" while cooking, As per this embodiment the device 1000 may be gripped via the handle member 400 to hold the device 1000 by a user. Further, the device 1000 may be engaged, via the attaching member 100, with the top "$P_T$" of the pot "P", With such engagement, the conical structure 222 of the protruding member 200 may be capable of being partially extended within the pot "P", such as a portion 222a of the conical structure 222. Further, the lid "L" is angularly placed over the pot "P" by aligning a portion of the lid "L" on the seat 224 of the conically extending structure 222 of the protruding member 200, in order to ventilate the vapors 'V" from the pot "P" while cooking.

As per the usages of the device 1000 according to this embodiment, the lid "L" may be angularly placed over the pot "P" for ventilation of vapors from the pot "P" while cooking. At times, while cooking such an arrangement between the lid "L" and the pot "P" is required where the pot "P" may not be open wholly but partially to release the vapor partially, during such times, this feature, as explained herein, of the device 1000 may be utilized.

As described and discussed above, the present invention eliminates the inconvenience and awkwardness associated with the removal, draining, storage, and re-application of lids and other coverings for common pots, pans, and other cooking containers, addressing a whole host of frequently encountered annoyances and dangers, such as messy dripping of the cover or lid on the range or countertop; cumbersome placement and use of space for the covering while cooking; injury from contact with a hot vessel or covering or, notably harm arising from steam emanating from boiling or hot liquids upon removal of the covering, and the risk of dropping the lid due to slipping or handling a hot or condensation-covered handle, knob or the like.

Far from the incomplete tools provided by housewares and cookware inventions and products thus far, the present invention is an option that comfortably allows for the safe and easy removal and placement of a lid especially when hot and/or made wet or sticky by the vessel contents or splatter. It offers the unanswered solution for keeping the cooking area clean and sanitary by returning condensed liquids to the cooking vessel, and fits within space and storage confines of any kitchen. During and after use, it may be affixed to the edge of a pot or situated within a designated standing holder, providing easy access and immediate, safe convenient accessibility.

The foregoing descriptions of specific embodiments of the present discourse have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present disclosure.

What is claimed is:

1. A lid holding device for supporting a lid above a pot, the lid holding device comprising:
    an attaching member capable of being engaged to a pot, the attaching member having a complementary engaging structure to that of the pot to be capable of being engaged with the top of the pot, the attaching member being a bottom body portion of the lid holding device;
    a protruding member extending from the attaching member, the protruding member having a top portion and a bottom portion, the bottom portion of the protruding member engages with the attaching member and extends therefrom, the protruding member comprising a central body portion of the lid holding device extending up to the top and bottom portions thereof, wherein the bottom portion of the protruding member comprises:
       a substantially conically extending structure from the attaching member, the conical structure capable of being partially extendable within the pot when the lid holding device is engaged with the pot,
       the conically extending structure bends at the top to form a seat for the lid to be angularly aligned on the pot;
    a hook member extending from the top portion of the protruding member, the hook member capable of being engaged with the lid, the hook member comprising a curvature leading away from the lid capable of being engaged to the hook member, the hook member being a top body portion of the lid holding device; and
    a handle member coupled to the protruding member and extends linearly in a spaced manner from the protruding member, the handle member extends up to the entire length of the protruding member.

2. The lid holding device of claim 1, wherein the complementary engaging structure of the attaching member comprises a c-shaped clip profile comprising c-shaped flanges and a longitudinal flange extending in spaced manner downwardly from the attaching member to form a recess therebetween to engage with the top of the pot to firmly grip the c-shaped clip profile with the top of the pot.

3. The lid holding device of claim 1, wherein the top portion of the protruding member comprises a substantially curve shaped profile to be in sync with the curvature of the hook member.

4. The lid holding device of claim 1, wherein the protruding member extends taperedly between the top and bottom portions thereof.

5. The lid holding device of claim 1, wherein the hook member comprises a fork-like profile with one or more prongs.

6. The lid holding device of claim 1 further comprising a base support member to hold the lid holding device, the base support member comprising a drip catch profile to catch liquids dripping out of the lid.

7. The lid holding device of claim 6, wherein the base support member comprises a holding profile to hold the lid holding device in a position over the base support member.

8. The lid holding device of claim 6, wherein the base support member comprises a holding profile complementary to a profile of attaching member to hold the lid holding device in a position over the base support member.

9. The lid holding device of claim 1 further comprising a wall clip mountable to a wall to hold the lid holding device on to the wall.

10. A lid holding device for supporting a lid above a pot for ventilation of vapors from the pot while cooking, the lid holding device comprising:
an attaching member capable of being engaged to the pot;
a hook member capable of engaging the lid;
a protruding member extending between the attaching member and the hook member, the protruding member having a top portion, closer to the hook member, and, a bottom portion, closer to the attaching member, the protruding member comprising a central body portion extending up to the top and bottom portions thereof, wherein the bottom portion of the protruding member comprises:
a substantially conically extending structure from the attaching member, the conical structure capable of being partially extendable within the pot when the lid holding device is engaged with the pot,
the conically extending structure bends at a top to form a seat for the lid to be angularly aligned on the pot;
a handle member coupled to the protruding member and extends linearly in a spaced manner from the protruding member, the handle member extends up to the entire length of the protruding member.

11. The lid holding device of claim 10, wherein the protruding member extending taperedly between the top and bottom portions thereof.

12. The lid holding device of claim 10, wherein the hook member comprises a curvature leading away from the lid capable of being engaged to the hook member, and that the top portion of the protruding member comprises a substantially curve shaped profile to be in sync with the curvature of the hook member.

13. The lid holding device of claim 10, wherein the attaching member comprises a complementary engaging structure having a c-shaped clip profile comprising c-shaped flanges and a longitudinal flange extending in spaced manner downwardly from the attaching member to form a recess therebetween to engage with the atop of the lid to firmly grip the c-shaped clip profile with a top of the lid.

14. A lid holding device for supporting a lid above a pot for preventing liquids from dripping out of the lid, the lid holding device comprising:
an attaching member capable of being engaged to the pot;
a hook member capable of engaging the lid;
a protruding member extending between the attaching member and the hook member, the protruding member having a top portion and a bottom portion, the bottom portion of the protruding member engages with the attaching member and extends therefrom, the protruding member comprising a central body portion of the lid holding device extending up to the top and bottom portions thereof, wherein the bottom portion of the protruding member comprises:
a substantially conically extending structure from the attaching member, the conical structure capable of being partially extendable within the pot when the lid holding device is engaged with the pot,
the conically extending structure bends at the top to form a seat for the lid to be angularly aligned on the pot;
a handle member coupled to the protruding member and extends linearly in a spaced manner from the protruding member; and
a base support member to hold the lid holding device, the base support member comprising a drip catch profile to catch liquids dripping out of the lid, wherein the base support member comprises a holding profile to hold the lid holding device in a position over the base support member.

15. The lid holding device of claim 14, wherein the base support member comprises a holding profile complementary to a profile of the attaching member to hold the lid holding device in a position over the base support member.

* * * * *